(12) United States Patent
Wu

(10) Patent No.: US 10,630,967 B2
(45) Date of Patent: Apr. 21, 2020

(54) DISPLAY DEVICE AND DRIVING METHOD THEREOF

(71) Applicant: BOE Technology Group Co., Ltd., Beijing (CN)

(72) Inventor: Kun Wu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 243 days.

(21) Appl. No.: 15/538,299

(22) PCT Filed: Oct. 24, 2016

(86) PCT No.: PCT/CN2016/102995
§ 371 (c)(1),
(2) Date: Jun. 21, 2017

(87) PCT Pub. No.: WO2017/166795
PCT Pub. Date: Oct. 5, 2017

(65) Prior Publication Data
US 2018/0109778 A1  Apr. 19, 2018

(30) Foreign Application Priority Data
Apr. 1, 2016 (CN) .......................... 2016 1 0203051

(51) Int. Cl.
*H04N 13/398* (2018.01)
*H04N 13/317* (2018.01)
(Continued)

(52) U.S. Cl.
CPC ....... *H04N 13/398* (2018.05); *G02B 27/2214* (2013.01); *H04N 13/305* (2018.05); *H04N 13/31* (2018.05); *H04N 13/317* (2018.05)

(58) Field of Classification Search
CPC .. H04N 13/398; H04N 13/305; H04N 13/317; H04N 13/31
See application file for complete search history.

(56) References Cited

U.S. PATENT DOCUMENTS

| | | | | |
|---|---|---|---|---|
| 5,943,166 A | * | 8/1999 | Hoshi ................ | G02B 27/2214 359/475 |
| 2015/0070476 A1 | * | 3/2015 | Wei ....................... | H04N 13/31 348/54 |
| 2015/0070478 A1 | * | 3/2015 | Wei ....................... | H04N 13/31 348/60 |

FOREIGN PATENT DOCUMENTS

| | | |
|---|---|---|
| CN | 102087815 A | 6/2011 |
| CN | 102707448 A | 10/2012 |

(Continued)

OTHER PUBLICATIONS

Jan. 18, 2017—(WO) International Search Report and Written Opinion Appn PCT/CN2016/102995 with English Tran.

(Continued)

*Primary Examiner* — Jamie J Atala
*Assistant Examiner* — Hesham K Abouzahra
(74) *Attorney, Agent, or Firm* — Banner & Witcoff, Ltd.

(57) ABSTRACT

A display device and a driving method thereof are provided. The display device, including a display panel and a 3D grating provided above the display panel in a first direction, the 3D grating including a plurality of grating units sequentially arranged, and the display panel including a plurality of columns of pixels; wherein, the first direction and a column direction of the pixels have an angel of non-zero value therebetween. The sloped 3D grating and the black matrix pattern are no longer parallel with each other, thereby reducing moire patterns generated during display.

18 Claims, 4 Drawing Sheets

(51) Int. Cl.
*H04N 13/31* (2018.01)
*H04N 13/305* (2018.01)
*G02B 27/22* (2018.01)

(56) References Cited

FOREIGN PATENT DOCUMENTS

| CN | 103424874 A | 12/2013 |
| CN | 104423052 A | 3/2015 |
| CN | 104581131 A | 4/2015 |
| CN | 105445948 A | 3/2016 |
| CN | 105445949 A | 3/2016 |
| CN | 105629490 A | 6/2016 |

OTHER PUBLICATIONS

Jan. 22, 2017—(CN) First Office Action Appn 201610203051.3 with English Tran.
Jul. 11, 2017—(CN) Second Office Action Appn 201610203051.3 with English Tran.

* cited by examiner

DISPLAY DEVICE AND DRIVING METHOD THEREOF

The application is a U.S. National Phase Entry of International Application No. PCT/CN2016/102995 filed on Oct. 24, 2016, designating the United States of America and claiming priority to Chinese Patent Application No. 201610203051.3, filed on Apr. 1, 2016. The present application claims priority to and the benefit of the above-identified applications and the above-identified applications are incorporated by reference herein in their entirety.

TECHNICAL FIELD

Embodiments of the present disclosure relate to a display device and a driving method thereof.

BACKGROUND

With rapid development in stereoscopic display technologies, stereoscopic display devices are under increasing demand Among multiple technologies that realize three-dimensional (3D) stereoscopic display, naked-eye stereoscopic display is favored much due to its advantage of not requiring a viewer to wear glasses.

SUMMARY

Embodiments of the present disclosure provide a display device and a driving method thereof, for reducing moire patterns when performing display.

At least one embodiment of the present disclosure provides a display device, comprising a display panel and a 3D grating provided above the display panel in a first direction, the 3D grating comprising a plurality of grating units sequentially arranged, and the display panel comprising a plurality of columns of pixels; wherein, the first direction and a column direction of the pixels have an angel of non-zero value therebetween.

For example, in the display device provided by an embodiment of the disclosure, each of the pixels comprises at least three sub-pixels sequentially arranged in the column direction, and odd-numbered columns of pixels and even-numbered columns of pixels are spaced by a predetermined distance in the column direction, and the predetermined distance is less than or equal to a length of a sub-pixel in the column direction.

For example, in the display device provided by an embodiment of the disclosure, a pitch of each of the grating units satisfies a formula P=[D/(D+d)]×S; where, P is the pitch of each of the grating units, S is a length sum of n sub-pixels in a row direction, D is a distance between human eyes and the display panel, d is a distance between each of the grating units and the display panel, and n is a positive integer.

For example, in the display device provided by an embodiment of the disclosure, the n is equal to 3.

For example, in the display device provided by an embodiment of the disclosure, the pixels of the display panel is divided into first view pixel regions and second view pixel regions that are arranged alternately; the 3D grating is a slit grating, and the grating units comprises light shielding regions and light transmitting regions that are arranged alternately, and the light transmitting regions and the light shielding regions cover the first view pixel regions and the second view pixel regions.

For example, in the display device provided by an embodiment of the disclosure, in each of the grating units, a width ratio of each of the light transmitting regions to each of the light shielding regions in a row direction is in a range from 1:1 to 1:4.

For example, in the display device provided by an embodiment of the disclosure, the display panel is divided into first view pixel regions and second view pixel regions that are arranged alternately; the 3D grating is a lens grating, each of the grating units covers adjacent first view pixel region and second view pixel region.

For example, in the display device provided by an embodiment of the disclosure, the angle is in a range from 10° to 40°.

For example, in the display device provided by an embodiment of the disclosure, the angle is in a range from 10° to 20°.

At least one embodiment of the present disclosure provides a driving method of the above-mentioned display device provided by any one of embodiments of the present disclosure, wherein the display panel is divided into first view pixel regions and second view pixel regions that are arranged alternately; the method comprises: displaying a first view by sub-pixels in the first view pixel regions, and displaying a second view by sub-pixels in the second view pixel regions.

For example, in the driving method of the display device provided by an embodiment of the disclosure, before displaying the first view by the sub-pixels in the first view pixel regions, and displaying the second view by the sub-pixels in the second view pixel regions, the method further comprises: controlling luminance of the sub-pixels in a critical region of adjacent first view pixel region and second view pixel region to be lower than that of the sub-pixels in the other regions; and displaying the first view by the sub-pixels in the first view pixel regions and displaying the second view by the sub-pixels in the second view pixel regions comprises: displaying the first view by the sub-pixels in the first view pixel regions in accordance with a controlled luminance, and displaying the second view by the sub-pixels in the second view pixel regions in accordance with a controlled luminance.

For example, in the driving method of the display device provided by an embodiment of the disclosure, controlling the luminance of the sub-pixels in the critical region of the adjacent first view pixel region and the second view pixel region to be lower than that of the sub-pixels in the other regions comprises: controlling a ratio of the luminance of the sub-pixels in the critical region of the adjacent first view pixel region and the second view pixel region to the luminance of the sub-pixels in the other regions to be lower than 80%.

For example, in the driving method of the display device provided by an embodiment of the disclosure, the ratio of the luminance of the sub-pixels in the critical region of the adjacent first view pixel region and the second view pixel region to the luminance of the sub-pixels in the other regions is 50%.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the invention.

DETAILED DESCRIPTION

Figure 1:
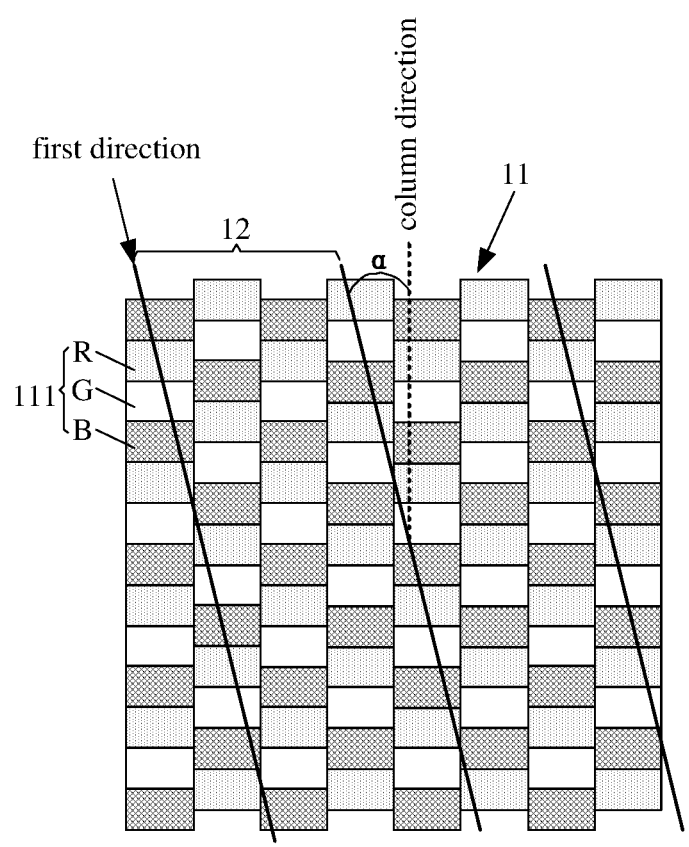
FIG. 1 is a structural schematic diagram of a display substrate provided by the first embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present disclosure belongs. The terms "first," "second," etc., which are used in the description and the claims of the present application for invention, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but can include an electrical connection, directly or indirectly. "On," "under," "right," "left" and the like are only used to indicate relative position relationship, and when the position of the object which is described is changed, the relative position relationship can be changed accordingly.

In order to clearly illustrate, a layer or an area may be amplified in the drawings of the embodiments of the present disclosure. It is to be understood that, when a member such as a layer, a film, an area or a substrate is located or disposed on or below another member, the member can be located or disposed on or below the another member directly, or an intermediate member or intermediate member(s) can be disposed.

Generally, a vertical screen display is designed for most stereoscopic display devices. A stereoscopic display device shall, however, be rotated by 90° when a stereoscopic image is being viewed in practice, i.e., the stereoscopic image is viewed with the screen being horizontal. As a result, direction of pixels is also rotated by 90°. A 3D grating in a stereoscopic display device, however, is arranged parallel with a black matrix pattern, making it easy to cause moire patterns during display.

First Embodiment

FIG. 1 is a structural schematic diagram of a display device provided by this embodiment. As illustrated in FIG. 1, the display device includes a display panel 11 and a 3D grating provided above the display panel 11 in a first direction, the 3D grating including a plurality of grating units 12 sequentially arranged (in FIG. 1, a region defined by two black slashes forms a position where a grating unit is located), and the display panel including a plurality of columns of pixels 111; the first direction and a column direction of the pixels has a predetermined angel therebetween, the predetermined angle being a as illustrated in FIG. 1, with a non-zero value (a cannot be zero). For example, the first direction is not parallel with or does not overlap the column direction of the pixels. For example, two adjacent grating units 12 are neighbored to each other.

The 3D grating provided in the first direction refers to that each grating unit is configured to extend in the first direction; for example, if the grating is a slit grating, both light shielding regions and light transmitting regions of the slit grating extend in the first direction, the first direction being a direction illustrated by the left arrow in FIG. 1.

α has a non-zero value; for example, a can be in a range from 10° to 40°, and further, for example, α can be 10° to 20°.

Each column of pixels in the display device includes a plurality of pixels 111 that are arranged in the column direction (e.g., the longitudinal direction as illustrated in FIG. 1); each of the pixels 111 includes at least three sub-pixels such as a red sub-pixel R, a green sub-pixel G and a blue sub-pixel B sequentially arranged in the column direction.

The present embodiment is described by taking that each of the pixels 111 includes a red sub-pixel R, a green sub-pixel G and a blue sub-pixel B as an example. In practical application, the number and colors of sub-pixels in each of the pixels 111 are not limited to those illustrated in FIG. 1; the number of sub-pixels in each of the pixels 111 can be different and the colors of the sub-pixels in each of the pixels 111 can be other colors, for which not all possibilities will be presented.

For example, in the display panel provided by an example, the arrangement of the pixels can be: pixels in each of the columns are arranged periodically and repeatedly, and the $n^{th}$ pixels in each of the columns are absolutely aligned so that the $n^{th}$ sub-pixels in each of the columns form a row of sub-pixels.

For example, in the display panel provided by another example, the arrangement of pixels can further be in a manner as illustrated in FIG. 1. As illustrated in FIG. 1, each of the pixels includes at least three sub-pixels sequentially arranged in the column direction; odd-numbered columns of pixels and even-numbered columns of pixels are spaced by a predetermined distance in the column direction, the predetermined distance is less than or equal to a length of a sub-pixel in the column direction.

For example, in one example, the display panel 11 further includes a black matrix (not illustrated in FIG. 1) which is arranged in a crisscross manner. Therefore, when there is an angle between the first direction of the 3D grating and the column direction of the pixels, there is a certain angle between the first direction of the 3D grating and the black matrix, i.e., the 3D grating is not parallel with the extension direction of the black matrix.

For example, the aforementioned display device can be a stereoscopic display device. For example, the stereoscopic display device can be a naked-eye stereoscopic 3D display device.

The present embodiment does not limit a type of the display panel, for example, the display panel can be a liquid crystal display panel and/or a light-emitting diode display panel and the like.

In any display device provided by the present embodiment, a 3D grating is provided above the display panel in the first direction, the first direction and the column direction of the pixels have an angel of non-zero value therebetween, and thus the sloped 3D grating and the black matrix pattern are no longer parallel with each other, reducing moire patterns generated during display.

Second Embodiment

Figure 2:
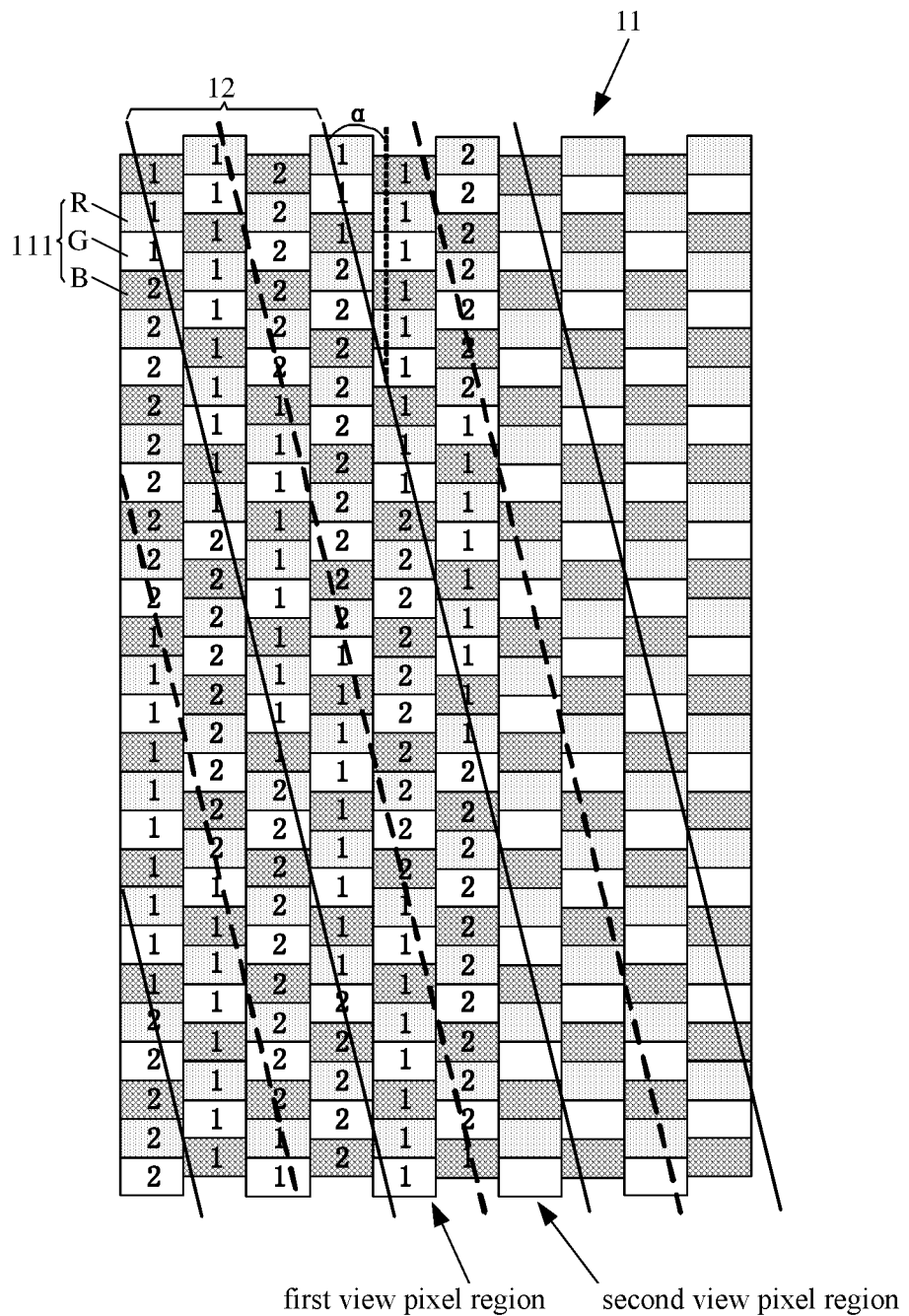
FIG. 2 is a structural schematic diagram of a display device provided by the second embodiment of the present disclosure.

FIG. 2 is a structural schematic diagram of a display device provided by the present embodiment. As illustrated in FIG. 2, the display device includes a display panel 11 and a 3D grating provided above the display panel 11 in a first direction, the 3D grating including a plurality of grating units 12 sequentially arranged. The display panel includes a plurality of columns of pixels 111. The first direction and the column direction of the pixels have an angle $\alpha$ of a non-zero value therebetween.

All the grating units 12 are configured as parallel with each other, and all the grating units 12 are arranged in the first direction, the first direction is the direction pointed to by the solid lines that indicate the grating units 12 in FIG. 2.

Figure 3:
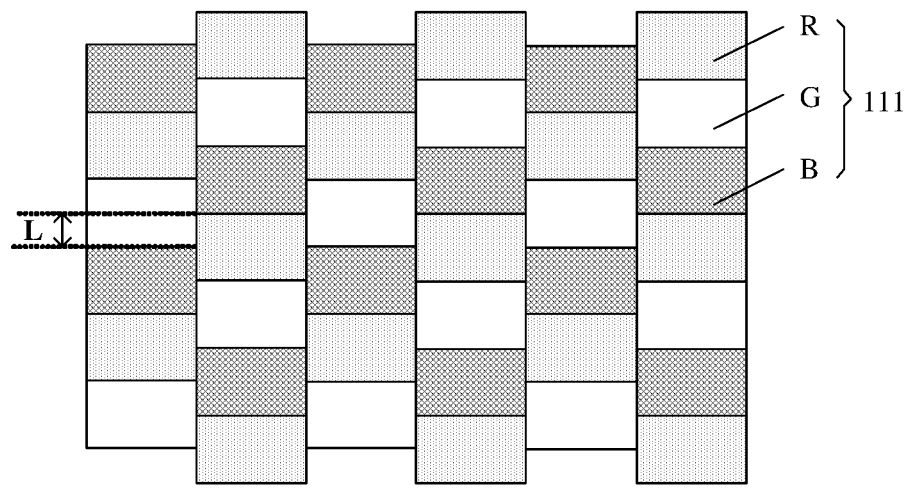
FIG. 3 is a schematic diagram of an arrangement of pixels illustrated in FIG. 2.

FIG. 3 is a schematic diagram of arrangement of the pixels illustrated in FIG. 2. As illustrated in FIG. 3, in the present embodiment, odd-numbered columns of pixels and even-numbered columns of pixels are spaced by a predetermined distance L in the column direction, the predetermined distance L is less than or equal to a length of a sub-pixel in the column direction. In FIG. 1, taking the first column of pixels and the second column of pixels as an example, the first column of pixels and the second column of pixels are spaced in the column direction by ½ of the length of a sub-pixel in the column direction.

As illustrated in FIG. 2, the display panel is divided into first view pixel regions and second view pixel regions that are arranged alternately, the sub-pixels in the first view pixel regions are configured to display a first view and the sub-pixels in the second view pixel regions are configured to display a second view. In FIG. 2, "1" denotes the first view and "2" denotes the second view, and thus sub-pixels marked by "1" can form the first view pixel regions and sub-pixels marked by "2" can form the second view pixel regions. One of the first view and second view is a left-eye view while the other a right-eye view, which will not be specifically defined here.

Figure 4:
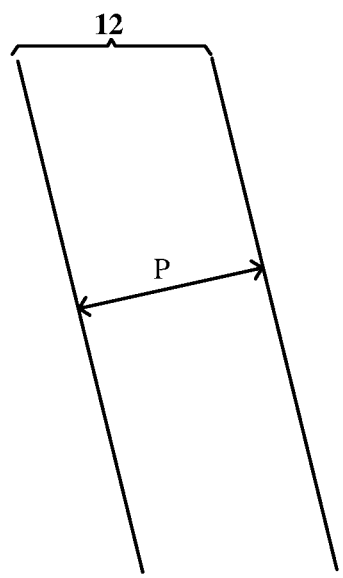
FIG. 4 is a schematic diagram of a grating unit illustrated in FIG. 2.

FIG. 4 is a schematic diagram of a grating unit illustrated in FIG. 2. As illustrated in FIG. 3, a pitch of a grating unit 12 satisfies P=[D/(D+d)]×S, where, P is the pitch of the grating unit 12, S is a length sum of n sub-pixels in a row direction, D is a distance between human eyes and the display panel 11, d is a distance between the grating unit 12 and the display panel 11, and n is a positive integer. The pitch of the grating unit can be, for example, a width of a grating unit 12 in a direction perpendicular to the first direction. In an example of the present embodiment, n is in a range from 2 to 9, and application of the aforementioned parameters can enable the display device to have a better viewing angle and 3D display effect. It is seen from the aforementioned formula that the pitch of each of the grating units 12 is less than the length sum of n sub-pixels in the row direction. For example, d=0.415 mm, P=0.09443 mm, n=3, S=0.0945 mm, D=380.876 mm, and application of the above parameters can enable the display device to have the best viewing angle and 3D display effect.

The predetermined angle $\alpha$ can be in a range from 10° to 40°. In one example of the present embodiment, the predetermined angle $\alpha$ is in a range from 10° to 20°, the application of which can reduce moire patterns. For example, if the predetermined angle $\alpha$ is in a range from 12.1° to 13.22°, it can have a better effect in reducing or avoiding moire patterns. Further, for example, the predetermined angle $\alpha$ is 13.19° or 12.11°, and the application of the above angles can reduce moire patterns while ensuring a stereoscopic perception when the display device is performing display, that is to say, the application of the aforementioned angles can ensure a prime comprehensive effect of ensuring stereo perception and reducing moire patterns. Taking the column direction of the pixels 11 in FIG. 2 as a reference, the 3D grating in the present embodiment is arranged sloped to the left; the 3D grating can also slope to the right in practical application, which will not be particularly presented in the drawings.

For example, the 3D grating 20 can be a slit grating, or a lens grating, and so on.

Figure 6:
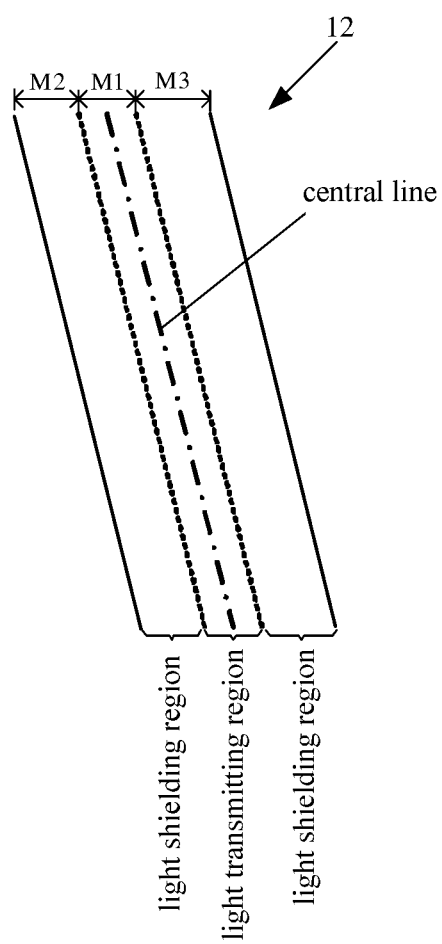
FIG. 6 is a schematic diagram of a partial structure of a 3D grating being a slit grating as illustrated in FIG. 2.

FIG. 6 is a schematic diagram of a partial structure of a 3D grating being a slit grating as illustrated in FIG. 2. FIG. 6 takes one grating unit 12 as an example for illustration. As illustrated in FIGS. 2 and 6, when the 3D grating is a slit grating, the grating unit 12 includes light shielding regions and light transmitting regions that are arranged alternately, the light shielding regions and light transmitting regions cover the first view pixel regions and the second view pixel regions. That is to say, a central line of each of the light transmitting regions corresponds to a boundary line between adjacent first view pixel region and second view pixel region, and the boundary line can be the central line of the granting unit 12 (the broken line in the grating unit 12 in FIG. 2). For example, a projection of the central line of each of the light transmitting region on the display panel 11 coincides with the boundary line between adjacent first view pixel region and second view pixel region. The grating unit 12 can cover adjacent first view pixel region and second view pixel region. In the grating unit 12, a width ratio of a width M1 of the light transmitting region in the row direction to a width (M2+M3) of the light shielding regions in the row direction is in a range from 1:1 to 1:4, application of which can ensure a prime 3D display effect for the display device. As illustrated in FIG. 2, in one example, in the grating unit 12, the width ratio of the width M1 of the light transmitting region in the row direction to the width (M2+M3) of the light shielding regions in the row direction is 1:3, application of which can ensure a prime 3D display for the display device.

As illustrated in FIG. 2, the 3D grating can be a lens grating, and each of the grating units 12 covers adjacent (the neighboring) first view pixel region and second view pixel region.

In the present embodiment, every six columns of sub-pixels form one pixel group, and pixel groups are arranged repeatedly. A display process of the display device will be specifically described in the following by taking one pixel group as an example, the pixel group includes a first column of pixels to a sixth column of pixels starting from left.

In the first column of pixels, a first sub-pixel to a third sub-pixel display a first view, a fourth sub-pixel to a twelfth sub-pixel display a second view, and a thirteenth sub-pixel to a twenty-second sub-pixel display the first view. Next nine sub-pixels display the second view, and further next ten sub-pixels display the first view, and so on and so forth until the column ends. That is to say, the first three sub-pixels display the first view; the next nine sub-pixels display the second view and the further next ten sub-pixels display the first view, and so on and so forth until the column ends.

In the second column of pixels, a first sub-pixel to a tenth sub-pixel display the first view, and an eleventh sub-pixel to a nineteenth sub-pixel display the second view. Next ten sub-pixels display the first view, and further next nine sub-pixels display the second view, and so on and so forth until the column ends. That is to say, the first ten sub-pixels display the first view; the next nine sub-pixels display the second view and the further next ten sub-pixels display the first view, and so on and so forth until the column ends.

In the third column of pixels, a first sub-pixel to a sixth sub-pixel display the second view, a seventh sub-pixel to a sixteenth sub-pixel display the first view, and a seventeenth sub-pixel to a twenty-fifth sub-pixel display the second view. Next ten sub-pixels display the first view, and further next nine sub-pixels display the second view, and so on and so forth until the column ends. That is to say, the first six sub-pixels display the second view; the next ten sub-pixels display the first view and the further next nine sub-pixels display the second view, and so on and so forth until the column ends.

In the fourth column of pixels, a first sub-pixel to a third sub-pixel display the first view, a fourth sub-pixel to a thirteenth sub-pixel display the second view, and a fourteenth sub-pixel to a twenty-second sub-pixel display the first view. Next ten sub-pixels display the second view, and further next nine sub-pixels display the first view, and so on and so forth until the column ends. That is to say, the first three sub-pixels display the second view; the next ten sub-pixels display the second view and the further next nine sub-pixels display the first view, and so on and so forth until the column ends.

In the fifth column of pixels, a first sub-pixel to a ninth sub-pixel display the first view, a tenth sub-pixel to a nineteenth sub-pixel display the second view, and a twentieth sub-pixel to a twenty-eighth sub-pixel display the first view. Next ten sub-pixels display the second view, and further next nine sub-pixels display the first view, and so on and so forth until the column ends. That is to say, the first nine sub-pixels display the first view; the next ten sub-pixels display the second view and the further next nine sub-pixels display the first view, and so on and so forth until the column ends.

In the sixth column of pixels, a first sub-pixel to a seventh sub-pixel display the second view, an eighth sub-pixel to a sixteenth sub-pixel display the first view, and a seventeenth sub-pixel to a twenty-sixth sub-pixel display the second view. Next nine sub-pixels display the first view, and further next ten sub-pixels display the second view, and so on and so forth until the column ends. That is to say, the first seven sub-pixels display the second view; the next nine sub-pixels display the first view and the further next ten sub-pixels display the second view, and so on and so forth until the column ends.

To sum up, it is seen from FIG. 1 that the central line and an edge of the 3D grating form a first view pixel region, and sub-pixels in the first view pixel region display the first view; the central line and another edge of the 3D grating form a second view pixel region, and sub-pixels in the second view pixel region display the second view. The sub-pixels for displaying the first view and the sub-pixels for displaying the second view are arranged alternately.

In the present embodiment, luminance of the sub-pixels in a critical region of adjacent first view pixel region and the second view pixel region is lower than luminance of the sub-pixels in the other regions. For example, a ratio of the luminance of the sub-pixels in critical region of the adjacent first view pixel region and the second view pixel region to the luminance of the sub-pixels in the other regions is lower than 80% and higher than 0. For example, the ratio of the luminance of the sub-pixels in critical region of the adjacent first view pixel region and the second view pixel region to the luminance of the sub-pixels in the other regions is 50%.

As illustrated in FIG. 2, all of the adjacent third sub-pixel and fourth sub-pixel, the adjacent twelfth sub-pixel and thirteenth sub-pixel, and the adjacent twenty-second sub-pixel and twenty-third sub-pixel in the first column locate in the critical region, so all of the luminance of the adjacent third sub-pixel and fourth sub-pixel, the luminance of the adjacent twelfth sub-pixel and thirteenth sub-pixel, and the luminance of the adjacent twenty-second sub-pixel and twenty-third sub-pixel in the first column are lower than luminance of sub-pixels in the other regions. The adjacent tenth sub-pixel and eleventh sub-pixel and the adjacent nineteenth sub-pixel and twentieth sub-pixel in the second column are located in the critical region, so all of the luminance of the adjacent tenth sub-pixel and eleventh sub-pixel and the luminance of the adjacent nineteenth sub-pixel and twentieth sub-pixel in the second column are lower than luminance of sub-pixels in the other regions. All of the adjacent sixth sub-pixel and seventh sub-pixel, the adjacent sixteenth sub-pixel and seventeenth sub-pixel, and the adjacent twenty-fifth sub-pixel and twenty-sixth sub-pixel in the third column are located in the critical region, so all of the luminance of the adjacent sixth sub-pixel and seventh sub-pixel, the luminance of the adjacent sixteenth sub-pixel and seventeenth sub-pixel, and the luminance of the adjacent twenty-fifth sub-pixel and twenty-sixth sub-pixel in the third column are lower than luminance of sub-pixels in the other regions.

As illustrated in FIG. 2, all of the adjacent third sub-pixel and fourth sub-pixel, the adjacent thirteenth sub-pixel and fourteenth sub-pixel, and the adjacent twenty-second sub-pixel and twenty-third sub-pixel in the fourth column are located in the critical region, so all of the luminance of the adjacent third sub-pixel and fourth sub-pixel, the luminance of the adjacent thirteenth sub-pixel and fourteenth sub-pixel, and the luminance of the adjacent twenty-second sub-pixel and twenty-third sub-pixel in the fourth column are lower than luminance of sub-pixels in the other regions. The adjacent ninth sub-pixel and tenth sub-pixel and the adjacent nineteenth sub-pixel and twentieth sub-pixel in the fifth column are located in the critical region, so all of the luminance of the adjacent ninth sub-pixel and tenth sub-pixel and the luminance of the adjacent nineteenth sub-pixel and twentieth sub-pixel in the fifth column are lower than luminance of sub-pixels in the other regions. All of the adjacent seventh sub-pixel and eighth sub-pixel, the adjacent sixteenth sub-pixel and seventeenth sub-pixel, and the adjacent twenty-sixth sub-pixel and twenty-seventh sub-pixel in the sixth column are located in the critical region, so all of the luminance of the adjacent seventh sub-pixel and eighth sub-pixel, the luminance of the adjacent sixteenth sub-pixel and seventeenth sub-pixel, and the luminance of the adjacent twenty-sixth sub-pixel and twenty-seventh sub-pixel in the sixth column are lower than luminance of sub-pixels in the other regions.

In the present embodiment, the luminance of sub-pixels in critical region of the adjacent first view pixel region and the second view pixel region is lower than the luminance of the sub-pixels in the other regions, which effectively weakens 3D crosstalk in the critical region, so that the 3D display effect is improved.

For example, the display panel 11 can further include a black matrix pattern which is arranged in a crisscross manner. Therefore, when there is a predetermined angle between the first direction of the 3D grating and the column direction of the pixels, the first direction of the 3D grating and the black matrix pattern have an angel. That is to say, the 3D grating is not parallel with the black matrix pattern.

For example, the display device can be a stereoscopic display device. For example, the stereoscopic display device can be a naked-eye 3D display device.

Figure 5:
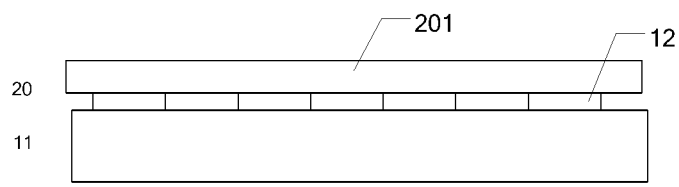
FIG. 5 is a sectional-view schematic diagram of a display device provided by the second embodiment.

As illustrated in FIG. 5, a 3D grating 20 is arranged on a display panel 11, and a base substrate 201 of the 3D grating is provided with a plurality of grating units 12 as aforementioned. Of course, it is also feasible to arrange the grating units 12 on the display panel 11 without setting the base substrate 201. In this case, the 3D grating can be a slit grating. When the 3D grating is a lens grating, the 3D grating can also be of a structure with a liquid crystal layer sandwiched between an upper base substrate and a lower base substrate. In this case, an upper electrode can be provided on the upper base substrate and a lower electrode can be provided on a lower electrode so as to form an electric field that drives liquid crystal in the liquid crystal layer in the 3D grating to form a lens, for example, to form a cylindrical lens.

For example, in the display device provided in the present embodiment, a 3D grating is provided above the display panel in a first direction, and the first direction and the column direction of the pixels has an angle of non-zero value therebetween. Therefore, the sloped 3D grating and the black matrix pattern are no longer parallel with each other, reducing moire patterns generated during display.

Third Embodiment

The present embodiment provides a driving method of a display device, the display device can be a display device provided by the aforementioned first embodiment or second embodiment, and the display panel is divided into first view pixel regions and second view pixel regions that are arranged alternately. The method includes: displaying a first view by sub-pixels in the first view pixel regions, and displaying a second view by sub-pixels in the second view pixel regions. One of the first view and the second view is a left-eye view, while the other is a right-eye view.

For example, in the present embodiment, before displaying the first view by the sub-pixels in the first view pixel regions, and displaying the second view by the sub-pixels in the second view pixel regions, the method further includes: controlling luminance of the sub-pixels in a critical region of adjacent first view pixel region and the second view pixel region to be lower than that of the sub-pixels in the other regions; and displaying the first view by the sub-pixels in the first view pixel regions and displaying the second view by the sub-pixels in the second view pixel regions comprises: displaying the first view by the sub-pixels in the first view pixel region in accordance with a controlled luminance, and displaying the second view by the sub-pixels in the second view pixel region in accordance with a controlled luminance. For example, a ratio of the luminance of the sub-pixels in critical region of the adjacent first view pixel region and the second view pixel region to the luminance of the sub-pixels in other regions is controlled to be lower than 80%. For example, the ratio of the luminance of the sub-pixels in critical region of the adjacent first view pixel region and the second view pixel region to the luminance of the sub-pixels in other regions is 50%.

The description in the second embodiment can be referred to for a particular description on the display process of the display device, which will not be repeated here.

In the display method of the display device provided in the present embodiment, a 3D grating is provided above the display panel in a first direction, and the first direction and the column direction of the pixels have an angel of non-zero value therebetween. Therefore, the sloped 3D grating and the black matrix pattern are no longer parallel with each other, thereby reducing moire patterns generated during display.

The technical solution provided in the present embodiment can be combined with human eye tracking technique, where a tracking result is obtained by tracking human's eyes, based on which operation over a display process of a display device can be realized. For example, light transmitting regions and light shielding regions can be operated in accordance with the tracking result when the 3D grating is a slit grating. For another example, views displayed in the first view pixel regions and the second view pixel regions can be controlled in accordance with the tracking result. For example, the first view pixel regions can be controlled to display the second view and the second view pixel regions can be controlled to display the first view in accordance with the tracking result, or, the first view pixel regions can be controlled to display the first view and the second view pixel regions can be controlled to display the second view in accordance with the tracking result. To sum up, the technical solution provided by the present embodiment in combination with the human eye tracking technique can effectively improve the viewing angle of the display device so as to improve viewing comfort.

The embodiments of the present disclosure have advantageous effects as follows.

In the display device and the driving method thereof provided by the present disclosure, a 3D grating is provided above the display panel in a first direction, and the first direction and a column direction of the pixels have an angel of non-zero value therebetween. Therefore, the sloped 3D grating and the black matrix pattern are no longer set as parallel, thereby reducing moire patterns generated during display.

The features in different embodiments or different features in the same embodiments can be combined without conflict.

What have been described above are only specific implementations of the present disclosure, the protection scope of the present disclosure is not limited thereto. Any changes or substitutions easily occur to those skilled in the art within the technical scope of the present disclosure should be covered in the protection scope of the present disclosure. Therefore, the protection scope of the present disclosure should be based on the protection scope of the claims.

This application claims the benefit of priority from Chinese patent application No. 201610203051.3, filed on Apr. 1, 2016, the disclosure of which is incorporated herein in its entirety by reference as a part of the present application.

What is claimed is:

1. A display device, comprising a display panel and a 3D grating provided above the display panel in the first direction, the 3D grating comprising a plurality of grating units sequentially arranged, and the display panel comprising a plurality of columns of pixels, wherein the first direction and a column direction of the pixels have an angle of a non-zero value therebetween, and wherein a pitch of each of the grating units satisfies a formula $P=[D/(D+d)] \times S$, where P is the pitch of each of the grating units, S is a length sum of n sub-pixels in a row direction, D is a distance between human eyes and the display panel, d is a distance between each of the grating units and the display panel, and n is a positive integer.

2. The display device according to claim 1, wherein n is equal to 3.

3. The display device according to claim 1, wherein the pixels of the display panel are divided into first view pixel regions and second view pixel regions that are arranged alternately, the 3D grating is a slit grating, and the grating units comprise light shielding regions and light transmitting regions that are arranged alternately, and the light transmitting regions and the light shielding regions cover the first view pixel regions and the second view pixel regions, respectively.

4. The display device according to claim 3, wherein, in each of the grating units, a width ratio of each of the light transmitting regions to each of the light shielding regions in a row direction is in a range from 1:1 to 1:4.

5. The display device according to claim 4, wherein, in each of the grating units, a width ratio of each of the light transmitting regions to each of the light shielding regions in the row direction is 1:3.

6. The display device according to claim 1, wherein the display panel is divided into first view pixel regions and second view pixel regions that are arranged alternately, the 3D grating is a lens grating, each of the grating units covers an adjacent first view pixel region and second view pixel region.

7. The display device according to claim 1, wherein the angle is in a range from 10° to 40°.

8. The display device according to claim 7, wherein the angle is in a range from 10° to 20°.

9. The display device according to claim 8, wherein the angle is in a range from 12.1° to 13.22°.

10. A driving method of the display device according to claim 1, wherein the display panel is divided into first view pixel regions and second view pixel regions that are arranged alternately, and wherein the method comprises:

displaying a first view by sub-pixels in the first view pixel regions, and displaying a second view by sub-pixels in the second view pixel regions.

11. The driving method of the display device according to claim 10, wherein before displaying the first view by the sub-pixels in the first view pixel regions, and displaying the second view by the sub-pixels in the second view pixel regions, the method further comprises: controlling luminance of sub-pixels in a critical region of an adjacent first view pixel region and second view pixel region to be lower than that of sub-pixels in other regions; and wherein the displaying the first view by the sub-pixels in the first view pixel regions and displaying the second view by the sub-pixels in the second view pixel regions comprises:

displaying the first view by the sub-pixels in the first view pixel regions in accordance with a controlled luminance, and displaying the second view by the sub-pixels in the second view pixel regions in accordance with a controlled luminance.

12. The driving method of the display device according to claim 11, wherein the controlling the luminance of the sub-pixels in the critical region of the adjacent first view pixel region and second view pixel region to be lower than that of the sub-pixels in the other regions comprises:

controlling a ratio of the luminance of the sub-pixels in the critical region of the adjacent first view pixel region and second view pixel region to the luminance of the sub-pixels in the other regions to be lower than 80%.

13. The driving method of the display device according to claim 12, wherein the ratio of the luminance of the sub-pixels in the critical region of the adjacent first view pixel region and second view pixel region to the luminance of the sub-pixels in the other regions is 50%.

14. A display device, comprising a display panel and a 3D grating provided above the display panel in a first direction, the 3D grating comprising a plurality of grating units sequentially arranged, and the display panel comprising a plurality of columns of pixels, wherein the first direction and a column direction of the pixels have an angle of a non-zero value therebetween, wherein each of the pixels comprises at least three sub-pixels sequentially arranged in the column direction, and odd-numbered columns of pixels and even-numbered columns of pixels are spaced by a predetermined distance in the column direction, and the predetermined distance is less than or equal to a length of sub-pixel in the column direction, wherein a pitch of each of the grating units satisfies a formula $P=[D/(D+d)] \times S$, where P is the pitch of each of the grating units, S is a length sum of n sub-pixels in a row direction, D is a distance between human eyes and the display panel, d is a distance between each of the grating units and the display panel, and n is a positive integer.

15. The display device according to claim 14, wherein the pixels of the display panel are divided into first view pixel regions and second view pixel regions that are arranged alternately, the 3D grating is a slit grating, and the grating units comprise light shielding regions and light transmitting regions that are arranged alternately, and the light transmitting regions and the light shielding regions cover the first view pixel regions and the second view pixel regions, respectively.

16. The display device according to claim 14, wherein the display panel is divided into first view pixel regions and second view pixel regions that are arranged alternately the 3D grating is a lens grating, and each of the grating units covers an adjacent first view pixel region and second view pixel region.

17. A driving method of a display device, the display device comprising a display panel and a 3D grating provided above the display panel in a first direction, the 3D grating comprising a plurality of grating units sequentially arranged, and the display panel comprising a plurality of columns of pixels; wherein the first direction and a column direction of the pixels have an angle of a non-zero value therebetween, wherein the display panel is divided into first view pixel regions and second view pixel regions that are arranged alternately, the method comprises:

displaying a first view by sub-pixels in the first view pixel regions, and displaying a second view by sub-pixels in the second view pixel regions, wherein before displaying the first view by the sub-pixels in the first view pixel regions, and displaying the second view by the sub-pixels in the second view pixel regions, the method further comprises: controlling luminance of sub-pixels that are in each column and in a boundary region of an adjacent first view pixel region and second view pixel region to be lower than that of sub-pixels that are in each column and in other regions of the adjacent first view pixel region and second view pixel region.

18. The driving method according to claim 17, wherein the displaying the first view by the sub-pixels in the first view pixel regions and displaying the second view by the sub-pixels in the second view pixel regions comprises:
   displaying the first view by the sub-pixels in the first view pixel regions in accordance with a controlled luminance, and
   displaying the second view by the sub-pixels in the second view pixel regions in accordance with a controlled luminance.

* * * * *